United States Patent Office 2,751,174
Patented June 19, 1956

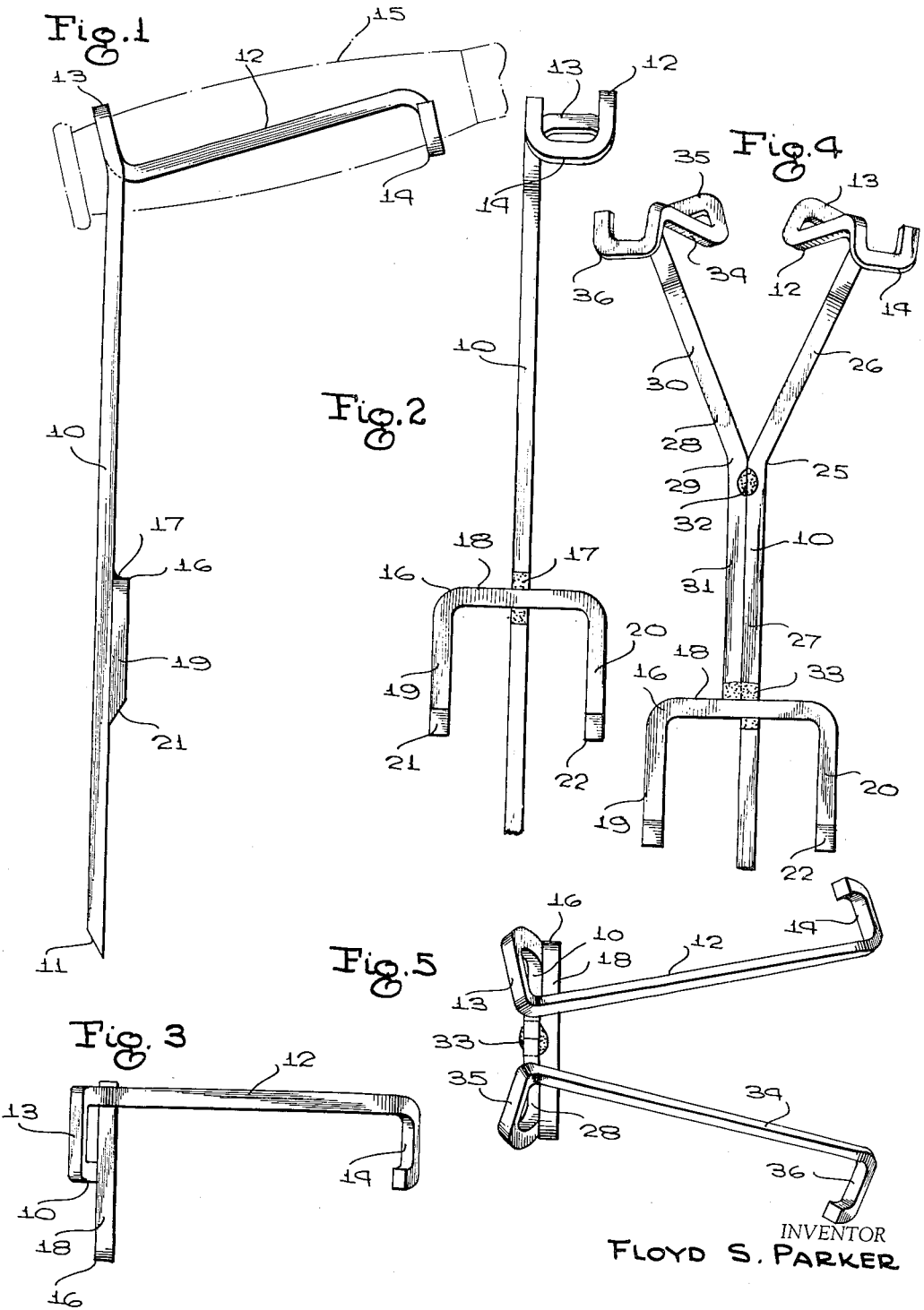

2,751,174

FISHING POLE HOLDER

Floyd S. Parker, McAlester, Okla.

Application December 19, 1952, Serial No. 326,840

1 Claim. (Cl. 248—42)

This invention relates to fishing pole holders and more particularly to a holder which can be stuck into the ground at the edge of a body of water and will hold a fishing pole or rod in upwardly inclined position relieving the owner of the necessity of holding the pole by hand while waiting for a fish to strike.

It is among the objects of the invention to provide an improved fishing pole holder which can be stuck into the ground in upright position and will receive the butt or handle end of a fishing pole or rod and support the pole in a position upwardly inclined from its butt or handle end; which has a lateral extension or step intermediate its length so that foot pressure can be utilized to facilitate forcing the holder into the ground and has a plurality of spaced apart ground-engaging prongs so that the holder will stand in upright position even when inserted into soft or muddy ground; which engages a fishing pole in a manner such that, while the pole is so firmly supported that it will not ordinarily be dislodged by accident or by the wind, it is easy to place in the holder and can be quickly and easily removed from the holder for landing a hooked fish; and which is simple and durable in construction and easy to carry, economical to manufacture, and neat and attractive in appearance.

Other objects and advantages will become apparent from a consideration of the following description and the appended claim in conjunction with the accompanying drawing wherein:

Figure 1 is a side elevational view of a fishing pole holder illustrative of the invention;

Figure 2 is a front elevational view of the holder illustrated in Figure 1;

Figure 3 is a top plan view of the holder illustrated in Figure 1;

Figure 4 is a front elevational view of a somewhat modified form of holder; and

Figure 5 is a top plan view of the holder illustrated in Figure 4.

With continued reference to the drawing, the holder, as illustrated in Figures 1, 2 and 3, comprises an elongated, straight post 10, preferably of square or rectangular cross sectional shape, having one pointed end 11 and formed at its other end to provide an arm 12 extending from the post at an obtuse angle thereto. The arm 12 is offset from the post and is connected at its proximal end to the post by an inverted U-shaped formation or member 13 which has one leg integrally connected to the upper end of the post 10, the member being inclined at an angle to the post and disposed substantially perpendicular to the arm 12. A U-shaped hook formation or hook 14 is on the other end of the arm 12 and coacts with the member 13 to form a support for the handle of a fishing pole. The hook formation 14 is U-shaped and curved in a direction toward the pointed end 11 of the post and is also disposed substantially perpendicular to the arm. The U-shaped formation 13 constitutes a saddle and the hook formation 14 a seat, and these are in alignment with each other longitudinally of the arm 12 and have a width sufficient to receive the butt end of handle of a fishing pole therein and a depth sufficient to firmly retain the pole. They are also spaced apart a sufficient distance to easily support a long fishing pole or rod in a position in which the pole extends from the holder and is upwardly inclined from the portion thereof engaged by the holder.

The U-shaped formation 13 is open at its bottom side and the hook formation 14 is open at its top side so that the fishing pole 15 can be placed in the holder by merely engaging its butt portion under the U-shaped formation 13 and then disposing the butt portion of the pole at a location spaced from the U-shaped formation in the hook formation 14.

A U-shaped structure 16 of substantially rectangular shape is secured to the post 10 intermediate the length of the post by suitable means, such as the weld joint 17, and is of substantially rectangular shape having spaced apart and substantially parallel legs of the same length. The formation 16 is secured to the post at the midlength location of the intermediate or bight portion 18 of the formation with the bight portion disposed substantially perpendicular to the post and extending symmetrically to opposite sides of the latter and the legs 19 and 20 of the U-shaped structure extending from the bight portion 18 thereof toward the pointed end of the post and disposed in spaced and substantially parallel relationship to the post at respectively opposite sides thereof. The legs 19 and 20 are pointed at their distal ends, as indicated at 21 and 22, and the pointed ends of the legs 19 and 20 are spaced from the pointed end 11 of the post so that the post penetrates the ground to a greater depth than the prongs constituted by the legs 19 and 20 of the U-shaped structure 16.

In order to insert the holder into the ground, the pointed end 11 of the post is placed on the ground and, with the post held in substantially vertical position, downward pressure is applied to the upper end of the post and the arm 12 to force the post downwardly, foot pressure being applied to the upper side of the intermediate portion 18 of the U-shaped structure 16, if necessary, to facilitate forcing the pointed end of the post and the pointed ends of the legs or prongs 19 and 20 into the ground.

The U-shaped structure 16, inserted into the ground near the surface of the ground, provides a support for the post so that the holder will remain in upright position, even when inserted into soft or muddy ground, and will hold the fishing pole in proper position to keep the smaller end of the pole from which the line extends above the water and the line clear and free of entanglement.

While the holder illustrated in Figures 1, 2 and 3 has its arm disposed to the left side of the post 10 when viewed from the back of the post, and constitutes, in effect, a left hand holder, it is to be understood that the arm 12 may be spaced from the right hand side of the post, if desired, to constitute a right hand holder without exceeding the scope of the invention.

In the modified arrangement illustrated in Figures 4 and 5, the holder is substantially the same as that illustrated in Figures 1, 2 and 3 and described above except that it is provided with two spaced apart receptacles or sockets for the butt ends of fishing poles.

In this modified arrangement the post 10 is bent intermediate its length and at a location between the intermediate portion 18 of the U-shaped structure 16 and the arm 12 which, in this case, is offset to the right hand side of the post, as indicated at 25 so that the portion 26 of the post at the side of the bend 25 adjacent the arm 12 is disposed at an angle to the portion 27 of the post between the bend 25 and the U-shaped structure 16.

A secondary post 28, provided intermediate its length with a bend 29 so that its portions 30 and 31 at opposite sides of the bend are disposed at an angle to each other, is disposed alongside the post 10 with the portion 31 thereof in contact with the side of the post 10 from which the arm 12 is displaced and extending along the portion 27 of the post 10 from the U-shaped structure 61 to the bend 25 of the post, the bend 29 in the secondary or auxiliary post being in alignment with the bend 25 in the main post 10 transversely of the post. The two posts are secured together by weld joints, as indicated at 32 and 33 and an arm 34, similar to the arm 12 extends from the end of the auxiliary post 28 remote from the U-shaped structure 16 at an obtuse angle to the post 28 and in divergent relationship to the arm 12, as illustrated in Figure 5.

The arm 34 is offset from the post 28 in a direction toward the arm 12 and connected at its proximal end to the post 28 by a U-shaped formation 35 curved in a direction away from the U-shaped structure 16 and a U-shaped hook formation 36 is provided at the distal end of the arm 34 and extends laterally from this arm in a direction such that it is in alignment with the U-shaped formation 35 longitudinally of the arm 34, the hook formation 36 being curved in a direction toward the U-shaped structure 16.

The two posts 10 and 28 thus constitute a Y-shaped structure the portions of which at the sides of the bends 25 and 29 therein remote from the U-shaped structure 16 diverge symmetrically of the plane along which the portions 27 and 31 of the two posts are in contact with each other and the arms 12 and 34 are disposed at the inner sides of the branches of the Y-shaped post structure.

In the modified form, the construction is such that the supported fishing rods will not only be each inclined from the horizontal to elevate the tip thereof, but also the inclined rods will diverge in the direction of their tips to space the fishing lines thereof a substantial distance apart, to prevent their entanglement. At the same time, the butts of the rods are disposed in closely spaced relation, so as to be conveniently accessible to the angler. It is to be noted, in this regard, that the particular construction is such as to insure that neither rod will interfere with the other while it is being taken out of its associated support structure, each rod being first lifted out of the U-shaped seat thereof and then being slipped out of the inverted U-shape saddle, with the movement of the rod during this operation taking place exteriorly of the space between the divergent arms 12, 34. This result is obtained by disposing the saddles in planes obliquely related to each other and to the plane of the posts, extending the arms 12, 34 from the inner legs of the saddles along lines substantially normal to the saddle planes, with said arms being inclined upwardly toward their divergent ends, and forming the seats 14, 36 on the outsides of the arms with said seats each lying in a plane substantially paralleling that of the saddle at the other end of the same arm. This is readily apparent from a study and comparison of Figures 4 and 5.

The invention may be embodied in other specific forms without departing from the spirit or essential characteristics thereof. The present embodiment is, therefore, to be considered in all respects an illustrative and not restrictive, the scope of the invention being indicated by the appended claim rather than by the foregoing description, and all changes which come within the meaning and range of equivalency of the claim are, therefore, intended to be embraced therein.

What is claimed is:

A holder for a pair of fishing rods comprising first and second posts each of which has its respective end portions disposed at an obtuse angle to each other; means on one end portion of the first post adapted for engagement in the ground, said one end portion and one end portion of the second post being fixedly connected in longitudinally contacting, parallel relation, the other end portions of the post diverging in a direction away from said means within a common plane; saddles of inverted U-shape adapted to individually straddle a pair of fishing rod butts and formed integrally and individually with the divergent extremities of said other end portions, each saddle extending laterally from the extremity to which it is extended in the space between said divergent other end portions, and having an outer leg formed as an extension of the end portion with which it is integral, said saddles lying in planes obliquely related to each other and to the plane of said other end portions of the posts; spaced arms respectively integral at one end with the other legs of the saddles and diverging in a direction away from the saddles, said arms inclining upwardly in the direction of the other ends and being extended substantially normally to the planes of the saddles; and U-shaped seats adapted to underlie said butts in supporting relation thereto and formed integrally with the divergent extremities of said arms, said seats being extended laterally of the arms in a direction away from the space between the arms, the seats having inner legs integral with said divergent extremities of the arms, the seat on each arm being disposed in a plane substantially parallel to the plane of the saddle at the other end of the same arm.

References Cited in the file of this patent

UNITED STATES PATENTS

| | | |
|---|---|---|
| 181,826 | Eanes | Sept. 5, 1876 |
| 518,986 | Cain | May 1, 1894 |
| 1,325,973 | Aronson | Dec. 23, 1919 |
| 2,190,960 | Wagler | Feb. 20, 1940 |
| 2,399,435 | Gregory | Apr. 30, 1946 |
| 2,526,067 | Curtess | Oct. 17, 1950 |
| 2,536,341 | Asher | Jan. 2, 1951 |
| 2,561,046 | Brooks | July 17, 1951 |
| 2,574,441 | Stewart | Nov. 6, 1951 |
| 2,645,439 | Gauthier | July 14, 1953 |

FOREIGN PATENTS

| | | |
|---|---|---|
| 351,632 | France | of 1905 |